United States Patent [19]

Kubota et al.

[11] Patent Number: 4,470,436
[45] Date of Patent: Sep. 11, 1984

[54] COIL FORMING APPARATUS

[75] Inventors: Tadashi Kubota, Katano; Tokuhito Hamane, Hirakata; Masaaki Tasai, Kadoma, all of Japan

[73] Assignee: Matsushita Electric Industrial Co., Ltd., Kadoma, Japan

[21] Appl. No.: 414,258

[22] PCT Filed: Dec. 24, 1980

[86] PCT No.: PCT/JP80/00324
 § 371 Date: Aug. 13, 1982
 § 102(e) Date: Aug. 13, 1982

[87] PCT Pub. No.: WO82/02290
 PCT Pub. Date: Jul. 8, 1982

[51] Int. Cl.³ .............................................. B21F 3/00
[52] U.S. Cl. ....................................... 140/92.1; 29/736
[58] Field of Search ................. 140/92.1; 29/732, 736, 29/734

[56] References Cited
 U.S. PATENT DOCUMENTS
 3,510,939  5/1970  Smith .................................... 29/605
 3,977,444  8/1976  Lauer et al. ........................ 140/92.1
 4,217,938  8/1980  Barrett et al. ..................... 140/92.1

Primary Examiner—Francis S. Husar
Assistant Examiner—Linda McLaughlin
Attorney, Agent, or Firm—Wenderoth, Lind & Ponack

[57] ABSTRACT

A coil forming apparatus of the type in which a coil (16) formed by winding a wire (1) around a winding frame (6, 7) having a plurality of winding steps (6a, 6b, 6c, 6d, 7a, 7b, 7c, 7d) of successively increased diameters is dropped into a coil receiving jig (3) disposed below the winding frame (6, 7) characterized in that pusher plates (21) adapted to vertically slide in slits formed in the winding frame (6, 7) to downwardly push the coil (16) formed on the winding steps are in stepped form corresponding to the contour of the winding of the winding frame and projecting a predetermined amount radially outwardly of the contour of each winding step and the vertical slide stroke is substantially equal to the height of each winding step, thus making it possible to reduce the overall height of the apparatus, shorten the coil forming time and facilitate the wire treatment between oils and at the terminal ends of coils.

1 Claim, 9 Drawing Figures

COIL FORMING APPARATUS

TECHNICAL FIELD

The present invention relates to an apparatus for producing coils for the stators of electric machines and particularly to a coil forming apparatus of the type in which a coil being formed is dropped into a coil receiving jig while winding a wire around a winding frame. The invention provides a coil winding machine adapted to facilitate and optimize the wire treatment between coils for the poles and at the terminal ends of the coils.

BACKGROUND ART

This type of conventional coil winding apparatus is shown in FIGS. 1 through 5.

The numeral 1 denotes a wire; 2 denotes a flyer through which the wire 1 is passed; and 3 denotes a coil receiving jig provided with blades 3a and insulator insertion guide 3b. The numerals 4 and 5 denote winding frame attaching plates, and 6 denotes a movable winding frame provided with winding steps 6a, 6b, 6c and 6d. The numeral 7 denotes a fixed winding frame provided with winding steps 7a, 7b, 7c and 7d and having an insertion hole 7e in which to insert the coil insertion jig 3. The movable and fixed winding frames 6 and 7 are put together to form a winding frame. The numeral 8 denotes a support plate, and 9 and 10 denote hold-down plates for fixing the winding frame attaching plates 4 and 5 to the support plate 8. The numeral 11 denotes vertically swingable tilt plate; 12 denotes a spherical bearing; and 13 denotes coil pusher bars adapted to be vertically moved with the swing movement of said tilt plate 11. Further, 13a denotes pusher plates adapted to be vertically slidable in slits a and b formed in the winding frames 6 and 7. The numeral 14 denotes a bearing metal element for slidably supporting the pusher bar 13; 15 denotes a shaft for fixing the support plate 8; and 16 denotes a coil.

In the arrangement described above, when the coil receiving jig 3 is positioned under the fixed winding frame 7, the shaft 15 is lowered, the coil insertion jig 3 is inserted in the insertion hole 7e of the fixed winding frame 7, the winding step 7a and blades 3a mesh with each other, the flyer 2 having the wire 1 inserted therein rotates along a circular path 0, and the wire 1 is wound around the winding steps 6a and 7a; thus, the formation of the coil 16 for the first step is started. At this instant, the end 1a of the wire 1 is gripped by a lead wire cutter (not shown), but will be released when the coil 16 having a predetermined number of turns is formed. Further, in synchronism with the rotation of the flyer 2, the tilt plate 11 swings, moving the coil pusher bars 13 up and down through the intermediary of the spherical bearings 12, with the pusher plates 13a at their front ends gradually downwardly moving the coil 16 formed on the winding steps 6a and 7a by the flyer 2, so that except for a portion of the coil formed at the end of winding, all other portions are dropped into the coil insertion jig. Upon completion of the formation of the coil for the first step, the shaft 15 lowers again, bringing the winding step 7b on the fixed winding frame 7 into engagement with the blades 3a, so that the wire 1, which is being wound around the winding steps 6a and 7a, is then wound onto the winding steps 6b and 7b: thus, the formation of the coil for the second step is started. The formation of the coil for the third and fourth steps will be effected in the same way (FIG. 3). Upon completion of the formation of the coil for one pole, a coil gripper 17 approaches the movable winding frame 6 so as to grip the wire 1 between the movable winding frame 6 and the flyer 2; it grips the wire 1 with weak force. Subsequently, the pusher plates 13a on the coil pusher bars 13 are lowered through a stroke S in FIG. 3, whereby the coil 16 partly left on the individual winding steps is held down on the coil receiving jig 3. At this instant, the coil gripper 17 is gripping the wire 1 with weak force allowing the wire to slide. When the coil 16 is fully pressed into the coil receiving jig 3, the coil pusher bars 13 and shaft 15 are lifted, separating the coil receiving jig 3 from the insertion hole 7e of the fixed winding frame 7 to complete thheight of the apparatus means that insertion of the wire 1 into a wire passageway 20, etc., located in the uppermost region of the apparatus must be performed at a high place, thus making the handling of the apparatus inconvenient.

Further, another disadvantage is that the large downward stroke S of the coil pusher bars 13 entails much time in pushing the coil 16 into the coil receiving jig 3.

DISCLOSURE OF THE INVENTION

The present invention provides a coil forming apparatus of the type wherein a coil formed by winding a wire around a winding frame having a plurality of winding steps of successively larger diameters is dropped into a coil receiving jig positioned below said winding frame, said apparatus being characterized in that pusher plates adapted to slide vertically in slots formed in said winding frame and downwardly push the coil formed on the winding steps are in stepped form corresponding to the contour of said winding frames and the vertical slide strokes are substantially equal to the respective heights of the winding steps, thereby making it possible to reduce the height of the apparatus, shorten the coil forming time and facilitate the wire treatment between coils and at the terminal ends.

BEST MODE OF CARRYING OUT THE INVENTION

An embodiment of the invention will now be described with reference to FIGS. 6 through 9.

Figure 1:
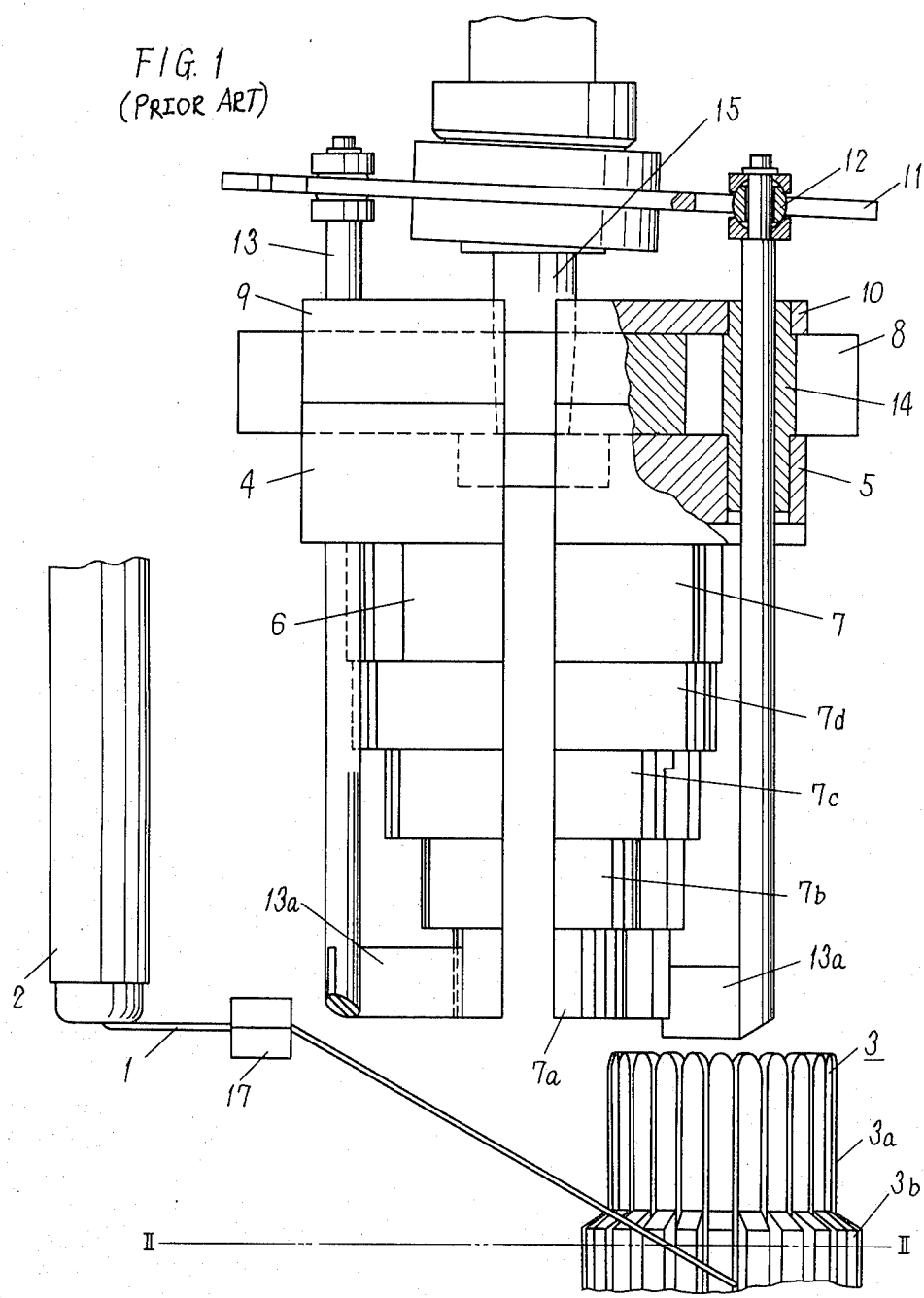
FIG. 1 is a front view showing how a coil is formed on a conventional coil forming apparatus provided with coil pusher bars.
Figure 2:
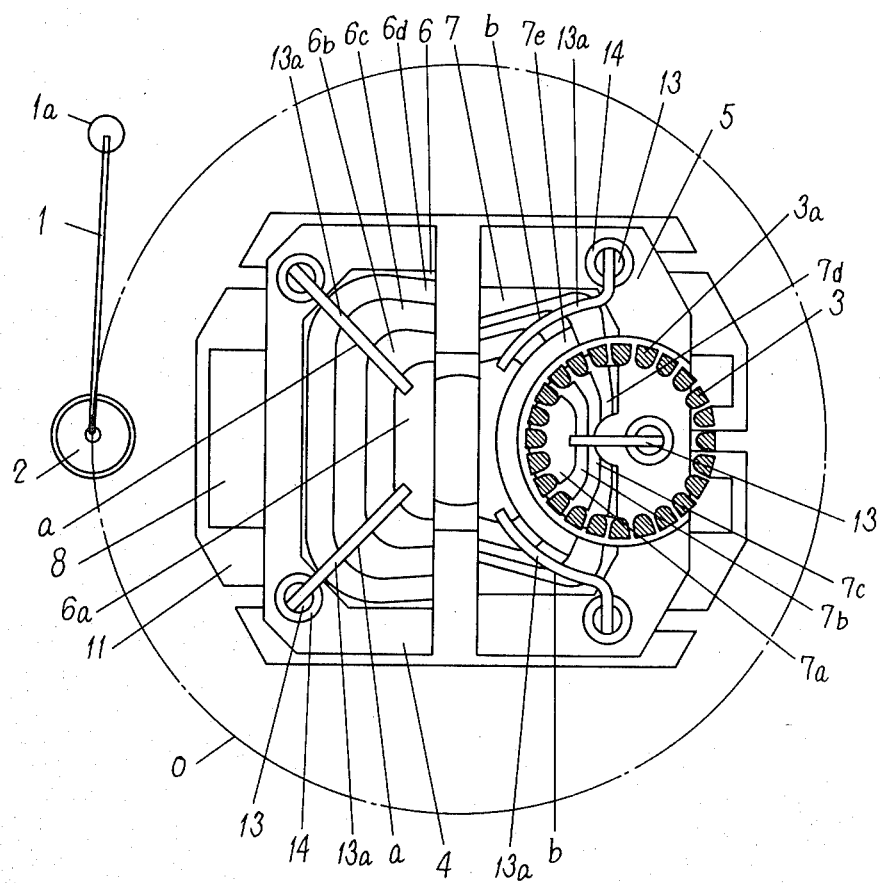
FIG. 2 is a sectional view taken along the line II—II in FIG. 1.
Figure 3:
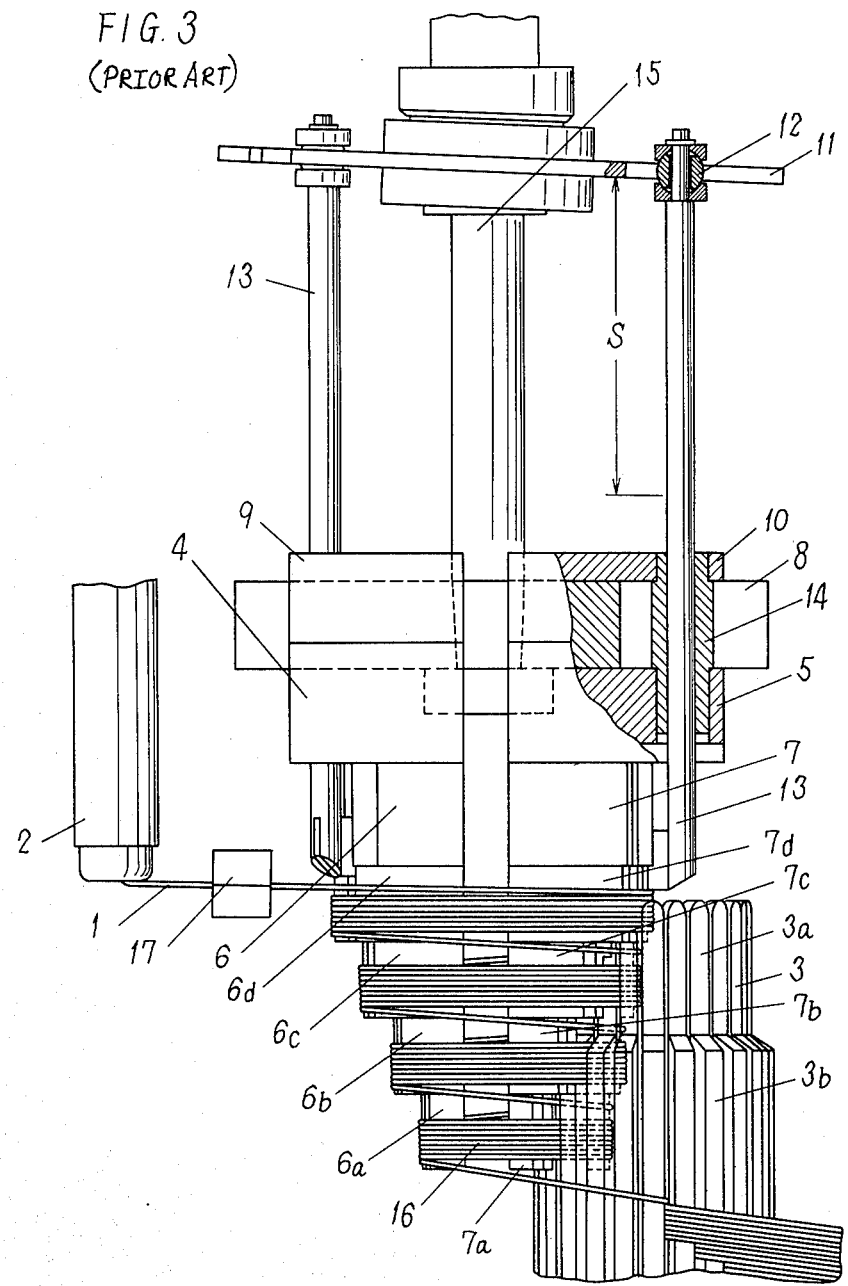
FIGS. 3 and 4 are front views showing different states of said apparatus.
Figure 4:
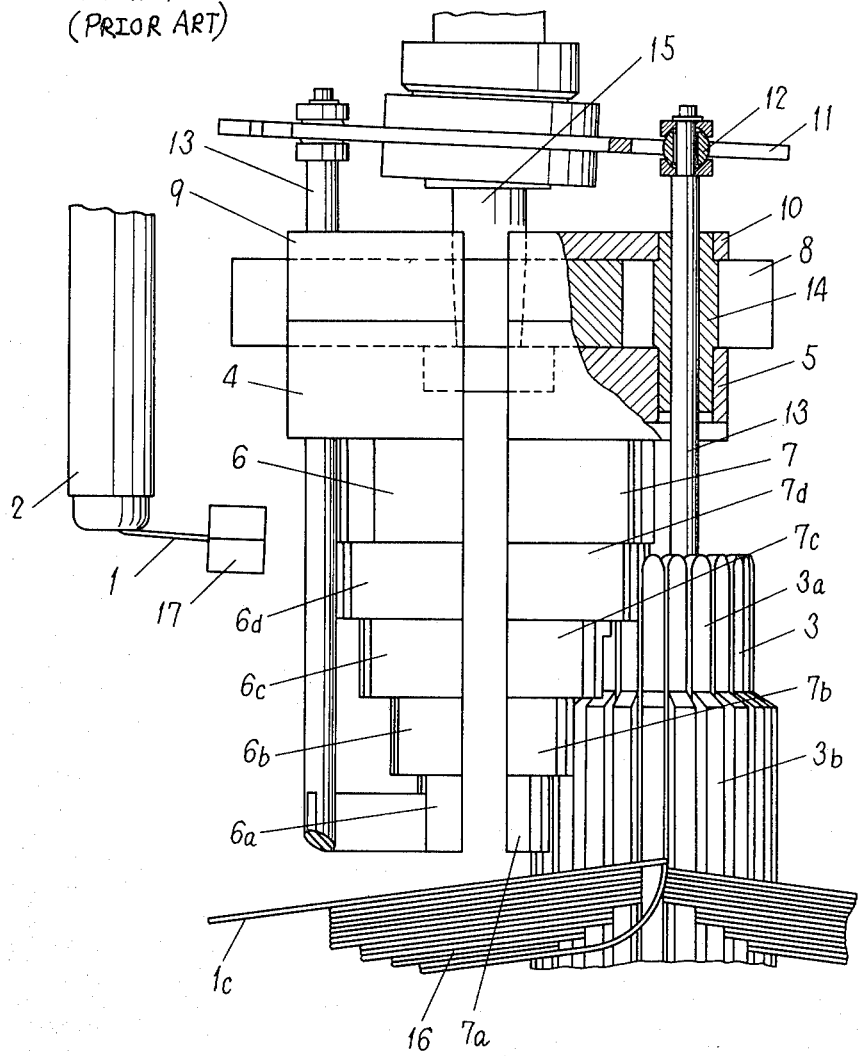
Figure 6:
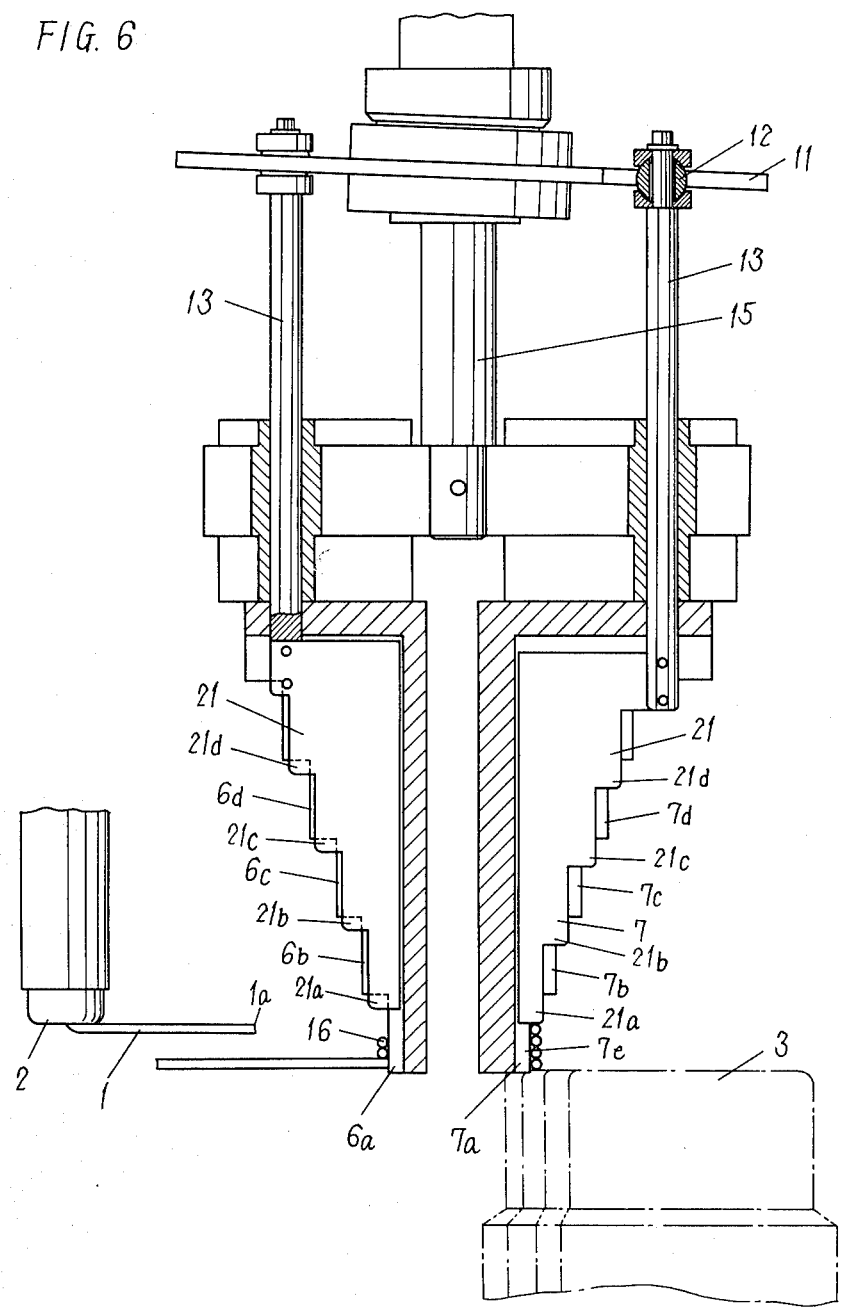
FIGS. 6 through 9 are sectional views showing different winding states of a winding frame provided with coil pusher plates in an embodiment of the present invention.

In FIG. 6, the numeral 21 denotes pusher plates fixed on hold-down bars 13 and being essentially different in shape from the hold-down plates 13a in the conventional example (FIG. 1). That is, the pusher plates 21 of the invention have coil pusher portions 21a, 21b, 21c and 21d disposed inside the outer surfaces of the winding steps 6b, 6c, 6d, . . . on the winding frames 6 and 7 but outside the outer surfaces of the next lower winding steps 6a, 6b and 6c, said pusher plates being plates in stepped form substantially corresponding to the stepped form of said winding frames 6 and 7.

Figure 5:
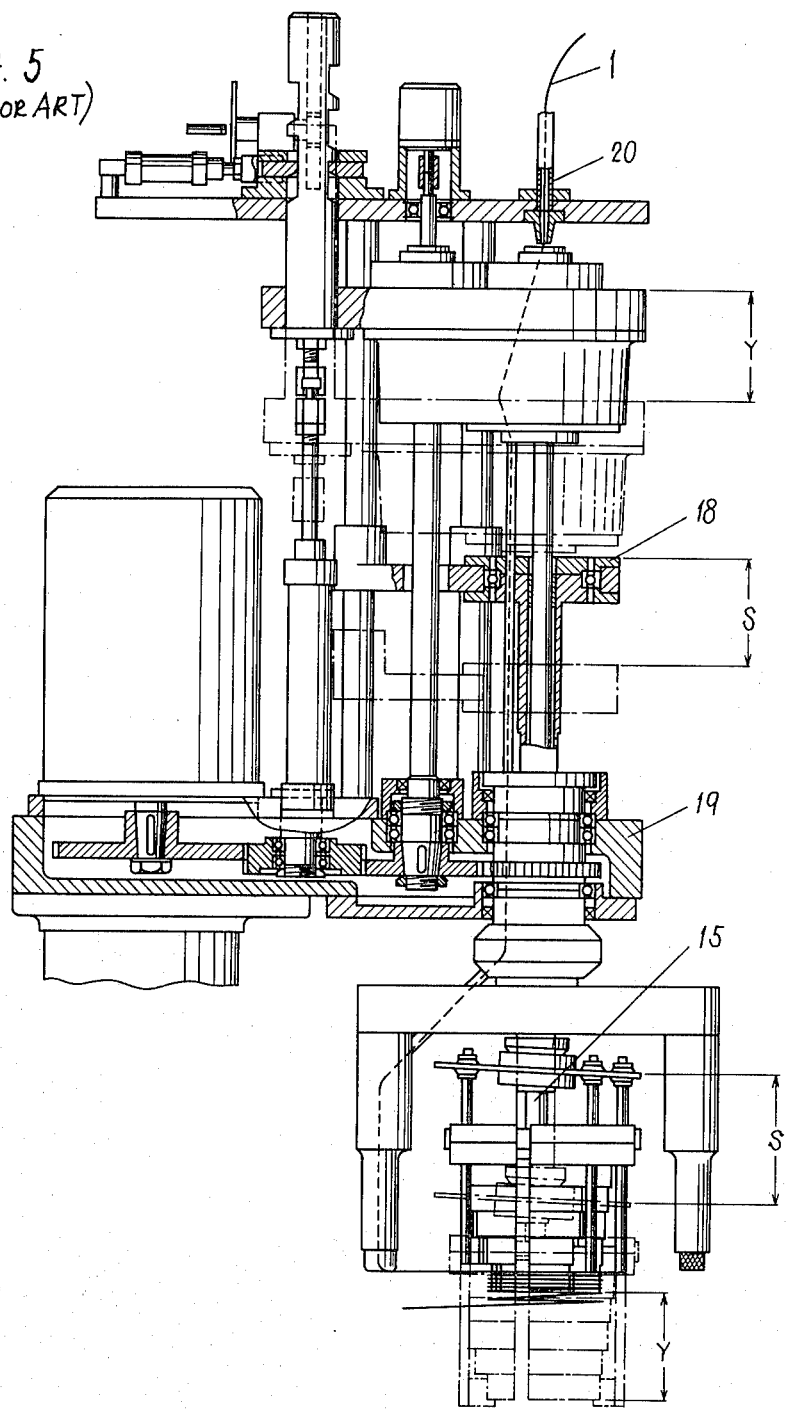
FIG. 5 is a front view, partly in section, showing the whole of said apparatus.
Figure 7:
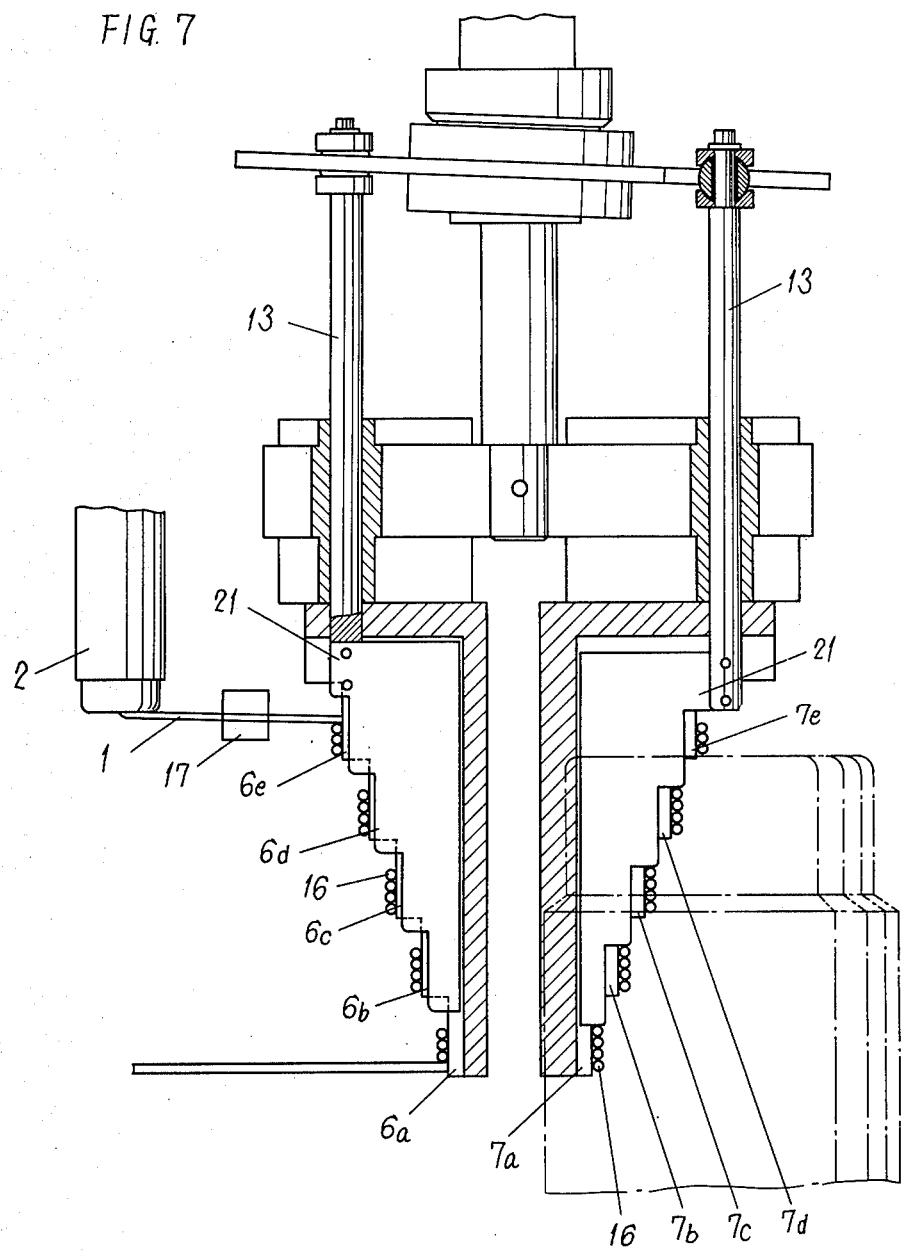
Figure 8:
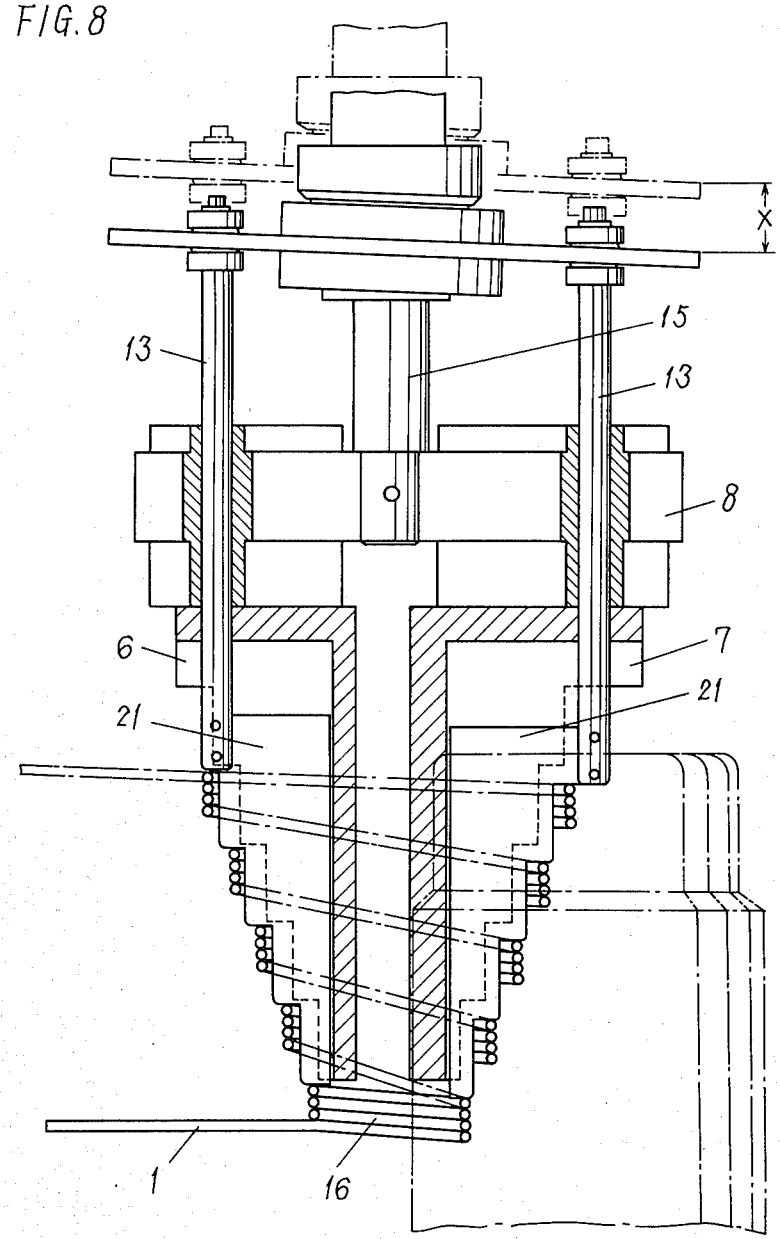
Figure 9:
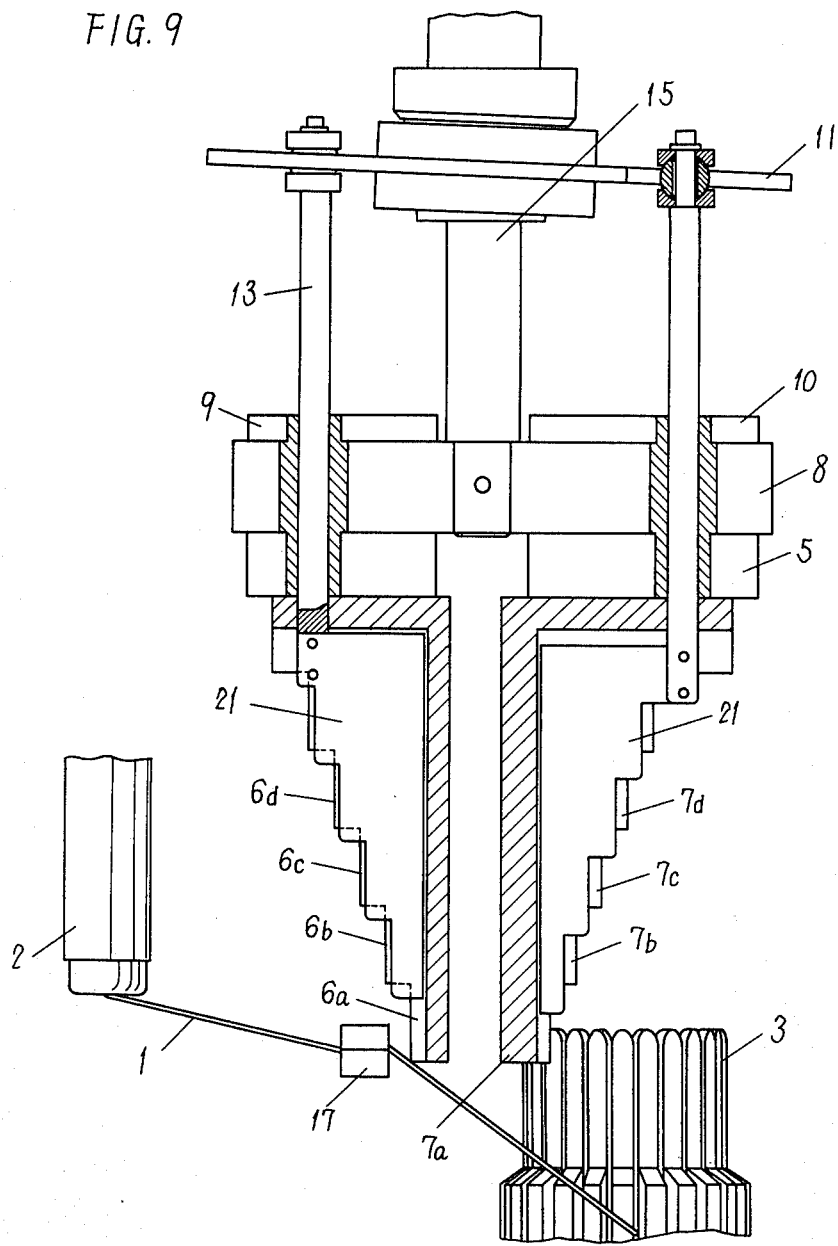

In the above arrangement, when the coil receiving jig 3 is positioned under the fixed winding frame 7, the shaft 15 is lowered and the coil receiving jig 3 is inserted in the insertion hole 7e of the fixed winding frame 7. Concurrently, the pusher plates 21 on the coil pusher bars 13 are lowered the same distance as that traveled by the winding frame 7. The flyer 2 having the wire 1 passed therethrough is rotated to wind the wire 1 around the winding steps 6a and 7a, thus starting the formation of a coil 16 for the first step. At this instant, the end 1a of the wire 1 is gripped by a lead wire cutter (not shown), which will release the wire 1 when the coil 16 having a predetermined number of turns in formed. Further, in synchronism with the rotation of the flyer 2, the tilt plate 11 swings, moving the coil pusher bars 13 up and down through the intermediary of the spherical bearings 12, with the coil pusher portions 21a of the pusher plates 21 gradually downwardly moving the coil 16 formed on the winding steps 6a and 7a by the flyer 2, so thatt except for a portion of the coil at the end of winding, all other portions are dropped into the coil receiving jig 3. Upon completion of the formation of the coil for the first step, the shaft 15 is lowered again, bringing the winding step 7b on the fixed winding frame 7 into engagement with the blades 3b. The coil pusher bars 13 are lowered the same distance as that traveled by the winding frames 6 and 7. The wire 1, which is being wound around the winding steps 6a and 7a by the flyer 2, is then wound onto the winding steps 6b and 7b; thus, the formation of the coil for the second step is started. Concurrently with the formation of the coil, the coil is progressively pushed into the coil receiving jig 3 by the up-and-down movement of the pusher plates 21, but, this time, the coil pusher portions 21b of the pusher plates 21 cause the drop-in of the coil for steps 6b and 7b. Moreover, the same up-and-down movement of the pusher plates 21 as that for the first step winding operation suffices for the purpose. The formation of the coil in the third and fourth step winding operations is effected in the same way, with the coil drop-in operation progressively shifting to the coil pusher portions 21c and 21d. FIG. 7 shows the completion of the formation of the coil for the first pole. Upon completion of the formation of the coil, in order to grip the wire 1 between the winding frames 6 and 7 and the flyer 2, the wire gripper 17 approaches the winding frames 6 and 7 and grips the wire 1 with weak force. Subsequently, as shown in FIG. 8, the pusher plates 21 are lowered through a stroke indicated by X (substantially equal to the height of a single winding step), pushing the coil 16 wound on the winding steps into the coil receiving jig 3. At this instant, the gripper 17 is gripping the wire 1 with weak force allowing the wire 1 to slide. When the coil has been completely pushed into the coil receiving jig 3, the pusher plates 21 and winding frames 6 and 7 are lifted. Subsequently, the wire gripper 17 is moved centrally of the winding frames 6 and 7, and the coil receiving jig 3 is then rotated for indexing corresponding to 360°/ the number of poles, whereupon it is positioned under the fixed winding frame 7. At this instant, the wire gripper 17 grips the wire 1 with strong force, moving to follow the indexing operation of the coil receiving jig 3, and the winding step 7a meshes again with the blades 3a. The positional relation which exists at this instant between the winding frames 6 and 7 and the gripper 17 and the wire 1 is shown in FIG. 9. Thereafter, the formation for the second pole is performed in the same way as for the first pole. As can be understood from the foregoing arrangement, when the gripper 17 approaches the winding steps 6b, 6c, and 6d, it does not strike the pusher plates 13a as it does in the conventional example, so that it is possible for the gripper to approach close to them, thus reducing the length of the bridge portion of the coil extending to the next pole. Further, since the winding frames 6 and 7 and the pusher bars 13 move at the same time, the space corresponding to the stroke Y in FIG. 5 can be eliminated and the overall height of the apparatus can be greatly reduced.

INDUSTRIAL APPLICABILITY

In the coil forming apparatus provided with the coil pusher plates according to the present invention, since the bridging line can be shortened, it is possible to improve the performance of the product and facilitate the subsequent process. Since the winding frame and pusher bars move at the same time, the overall height of the machine is reduced, the manufacture, maintenance and adjustment of the machine become easier, and the cost is low.

What is claimed is:

1. A coil forming apparatus comprising:
   a winding frame having a plurality of winding steps of successively changing sizes axially connected together and around which a wire is wound to form coils of successively different sizes corresponding to the sizes of said winding steps;
   a flyer movable around the winding frame for winding the wire around the winding frame to form the coils on said steps;
   pusher plates slidable in said winding frame and having steps formed therein corresponding to said winding steps, each pusher plate step projecting a predetermined amount radially outwardly of the coil forming surface of the next adjacent smaller winding step on the winding frame for, when the pusher plate is moved relative to said winding frame toward said next smaller winding step, it will engage the turn of the coil on said next smaller winding step which is closest to said firstmentioned winding step;
   pusher plate reciprocating means connected to said pusher plates for reciprocally moving said pusher plates relative to said winding frame toward and away from said next smaller step in synchronism with the movement of said flyer each time said flyer completes one rotation around said winding frame for forming a coil turn on said next smaller step, the movement toward said next smaller step being for a distance for pushing the thus wound turn downwardly for leaving a space for the next turn to be wound; and
   a coil receiving jig disposed below said winding frame for receiving the coils wound on said winding frame.

* * * * *